(12) United States Patent
Barlet-Gouedard et al.

(10) Patent No.: US 7,794,537 B2
(45) Date of Patent: *Sep. 14, 2010

(54) GEOPOLYMER COMPOSITION AND APPLICATION IN OILFIELD INDUSTRY

(75) Inventors: Véronique Barlet-Gouedard, Chatenay Malabry (FR); Benedicte Zusatz-Ayache, Chatenay Malabry (FR); Olivier Porcherie, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 893 days.

This patent is subject to a terminal disclaimer.

(21) Appl. No.: 11/462,724

(22) Filed: Aug. 7, 2006

(65) Prior Publication Data

US 2008/0028994 A1 Feb. 7, 2008

(51) Int. Cl.
C04B 16/08 (2006.01)
(52) U.S. Cl. .............. 106/672; 106/600; 106/676; 106/677; 106/678; 106/679; 106/716; 106/737; 106/DIG. 1
(58) Field of Classification Search ........... 106/713, 106/737, 600, 672, 676, 677, 678, 679, 716, 106/DIG. 1
See application file for complete search history.

(56) References Cited

U.S. PATENT DOCUMENTS

| | | | |
|---|---|---|---|
| 4,509,985 A | 4/1985 | Davidovitz | |
| 4,859,367 A | 8/1989 | Davidovitz | |
| 5,349,118 A | 9/1994 | Davidovitz | |
| 5,356,579 A | 10/1994 | Jennings et al. | |
| 5,539,140 A | 7/1996 | Davidovitz | |
| 5,626,665 A | 5/1997 | Barger et al. | |
| 5,635,292 A | 6/1997 | Jennings et al. | |
| 5,637,412 A | 6/1997 | Jennings et al. | |
| 5,788,762 A | 8/1998 | Barger et al. | |
| 6,869,473 B2 * | 3/2005 | Comrie | 106/697 |
| 7,141,112 B2 * | 11/2006 | Comrie | 106/697 |
| 7,294,193 B2 * | 11/2007 | Comrie | 106/707 |
| 2005/0096207 A1 | 5/2005 | Urbanek | |
| 2008/0028995 A1 * | 2/2008 | Barlet-Gouedard et al. | 106/811 |
| 2008/0178525 A1 * | 7/2008 | Comrie | 44/559 |

FOREIGN PATENT DOCUMENTS

EP 0026687 4/1981

(Continued)

OTHER PUBLICATIONS

IN 200402137 Aug. 18, 2006 Krishnan et al. abstract only.*

(Continued)

*Primary Examiner*—Paul Marcantoni
(74) *Attorney, Agent, or Firm*—David Cate; Robin Nava; Jeff Griffin

(57) ABSTRACT

The invention provides geopolymeric compositions, which have controllable thickening and setting times for a wide range of temperatures and a large range of geopolymer slurry densities. The geopolymer slurry compositions have good mixability and pumpability, while the set materials develop good compressive strength and permeability. The invention discloses a method for preparing geopolymer for oilfield cementing applications. The geopolymeric compositions according to the invention comprises a suspension comprising an aluminosilicate source, a metal silicate, an alkali activator, lightweight or heavyweight fillers and a carrier fluid wherein the suspension of said geopolymeric composition is pumped in a well and allowed to set.

97 Claims, 2 Drawing Sheets

FOREIGN PATENT DOCUMENTS

| | | | |
|---|---|---|---|
| EP | 0621247 | | 10/1994 |
| WO | 9113830 | | 9/1991 |
| WO | WO 93/16965 | * | 9/1993 |
| WO | 2005019130 | | 3/2005 |

OTHER PUBLICATIONS

Duxson P., Provis J.L., Lukey G.C., Separovic F., Van Deventer J.S.J.; 29Si NMR study of structural ordering in aluminosilicate geopolymer gels; Langmuir; 2005; 21 (7), 3028-3036.

van Jaarsveld J.G.S., van Deventer J.S.J., Lukey G.C.; A comparative study of kaolinite versus metakaolinite in fly ash based geopolymers containing immobilized metals; Chemical Engineering Communications; 2004; 191 (4), 531-549.

Provis J.L., Van Deventer J.S.J., Lukey G.C.; A conceptual model for solid-gel transformations in partially reacted geopolymeric systems; Ceramic Transactions; 2005; 165 ( ), 49-70.

Xu H., Van Deventer J.S.J., Roszak S., Leszczynski J.; Ab Initio Study of Dissolution Reactions of Five-Membered Aluminosilicate Framework Rings; International Journal of Quantum Chemistry; 2004; 96 (4), 365-373.

Criado M., Palomo A., Fernandez-Jimenez A.; Alkali activation of fly ashes. Part 1: Effect of curing conditions on the carbonation of the reaction products; Fuel; 2005; 84 (16), 2048-2054.

Buchwald A., Schulz M.; Alkali-activated binders by use of industrial by-products; Cement and Concrete Research; 2005; 35 (5), 968-973.

Palomo A., Lopez de la Fuente J.I.; Alkali-activated cementitous materials: Alternative matrices for the immobilisation of hazardous wastes—Part I. Stabilisation of boron; Cement and Concrete Research; 2003; 33 (2), 281-288.

Roy D.M.; Alkali-activated cements: Opportunities and challenges; Cement and Concrete Research; 1999; 29 (2), 249-254.

Puertas F., Martinez-Ramirez S., Alonso S., Vazquez T.; Alkali-activated fly ash/slag cements. Strength behaviour and hydration products; Cement and Concrete Research; 2000; 30 (10), 1625-1632.

Kovalchuk G., Fernandez-Jimenez A., Palomo A.; Alkali-activated fly ash: Effect of thermal curing conditions on mechanical and microstructural development—Part II; Fuel; 2007; 86 (3), 315-322.

Palomo A., Grutzeck M.W., Blanco M.T.; Alkali-activated fly ashes: A cement for the future; Cement and Concrete Research; 1999; 29 (8), 1323-1329.

Fernandez-Jimenez A., Puertas F.; alkali-activated slag cements: Kinetic studies; Cement and Concrete Research; 1997; 27 (3), 359-368.

Fernandez-Jimenez A., Palomo J.G., Puertas F.; Alkali-activated slag mortars: Mechanical strength behaviour; Cement and Concrete Research; 1999; 29 (8), 1313-1321.

Granizo M.L., Alonso S., Blanco-Varela M.T., Palomo A.; Alkaline activation of metakaolin: Effect of calcium hydroxide in the products of reaction; Journal of the American Ceramic Society; 2002; 85 (1), 225-231.

Fernandez-Jimenez A., Palomo A.; Characterisation of fly ashes. Potential reactivity as alkaline cements; Fuel; 2003; 82 (18), 2259-2265.

Phair J W., Smith J.D., Van Deventer J.S.J.; Characteristics of aluminosilicate hydrogels related to commercial "Geopolymers"; Materials Letters; 2003; 57 (28), 4356-4367.

Phair J.W., Van Deventer J.S.J.; Characterization of fly-ash-based geopolymeric binders activated with sodium aluminate; Industrial and Engineering Chemistry Research; 2002; 41 (17), 4242-4251.

Palomo A., Blanco-Varela M.T., Granizo M.L., Puertas F., Vazquez T., Grutzeck M.W.; Chemical stability of cementitious materials based on metakaolin; Cement and Concrete Research; 1999; 29 (7), 997-1004.

Comrie D.C., Kriven W.M.; Composite cold ceramic geopolymer in a refractory application; Ceramic Transactions; 2004; 153 ( ), 211-225.

Fernandez-Jimenez A., Palomo A.; Composition and microstructure of alkali activated fly ash binder: Effect of the activator; Cement and Concrete Research; 2005; 35 (10), 1984-1992.

Miranda J.M., Fernandez-Jimenez A., Gonzalez J.A., Palomo A.; Corrosion resistance in activated fly ash mortars; Cement and Concrete Research; 2005; 35 (6), 1210-1217.

Provis J.L., Lukey G.C., Van Deventer J.S.J.; Do geopolymers actually contain nanocrystalline zeolites? a reexamination of existing results; Chemistry of Materials; 2005; 17 (12), 3075-3085.

Bakharev T.; Durability of geopolymer materials in sodium and magnesium sulfate solutions; Cement and Concrete Research; 2005; 35 (6), 1233-1246.

Fernandez-Jimenez A., Puertas F.; Effect of activator mix on the hydration and strength behaviour of alkali-activated slag cements; Advances in Cement Research; 2003; 15 (3), 129-136.

Bakharev T., Sanjayan J.G., Cheng Y.-B.; Effect of admixtures on properties of alkali-activated slag concrete; Cement and Concrete Research; 2000; 30 (9), 1367-1374.

Phair J.W., Van Deventer J.S.J., Smith J.D.; Effect of Al source and alkali activation on Pb and Cu immobilisation in fly-ash based "geopolymers"; Applied Geochemistry; 2004; 19 (3), 423-434.

Duxson P., Lukey G.C., Separovic F., Van Deventer J.S.J.; Effect of alkali cations on aluminum incorporation in geopolymeric gels; Industrial and Engineering Chemistry Research; 2005; 44 (4), 832-839.

Xu H., Van Deventer J.S.J., Lukey G.C.; Effect of alkali metals on the preferential geopolymerization of stilbite/kaolinite mixtures; Industrial and Engineering Chemistry Research; 2001; 40 (17), 3749-3756.

Sindhunata, Van Deventer J.S.J., Lukey G.C., Xu H.; Effect of curing temperature and silicate concentration on fly-ash-based geopolymerization; Industrial and Engineering Chemistry Research; 2006; 45 (10), 3559-3568.

Bakharev T., Sanjayan J.G., Cheng Y.-B.; Effect of elevated temperature curing on properties of alkali-activated slag concrete; Cement and Concrete Research; 1999; 29 (10), 1619-1625.

Hewayde E., Nehdi M., Allouche E., Nakhla G.; Effect of geopolymer cement on microstructure, compressive strength and sulphuric acid resistance of concrete; Magazine of Concrete Research; 2006; 58 (5), 321-331.

Papakonstantinou C.G., Balaguru P.N.; Effect of microsphere size on the properties of a Geopolymer syntactic foam; International SAMPE Symposium and Exhibition (Proceedings); 2005; 50 ( ), 2925-2937.

Phair J.W., Van Deventer J.S.J.; Effect of silicate activator pH on the leaching and material characteristics of waste-based inorganic polymers; Minerals Engineering; 2001; 14 (3), 289-304.

Xu H., Van Deventer J.S.J.; Effect of source materials on geopolymerization; Industrial and Engineering Chemistry Research; 2003; 42 (8), 1698-1706.

Palacios M., Puertas F.; Effect of superplasticizer and shrinkage-reducing admixtures on alkali-activated slag pastes and mortars; Cement and Concrete Research; 2005; 35 (7), 1358-1367.

Vallepu R., Fernandez Jimenez A.M., Terai T., Mikuni A., Palomo A., MacKenzie K.J.D., Ikeda K.; Effect of synthesis pH on the preparation and properties of K-Al-bearing silicate gels from solution; Nippon Seramikkusu Kyokai Gakujutsu Ronbunshi/Journal of the Ceramic Society of Japan; 2006; 114 (1331), 624-629.

Van Jaarsveld J.G.S., Van Deventer J.S.J.; Effect of the alkali metal activator on the properties of fly ash-based geopolymers; Industrial and Engineering Chemistry Research; 1999; 38 (10), 3932-3941.

Lee W.K.W., Van Deventer J.S.J.; Effects of anions on the formation of aluminosilicate gel in geopolymers; Industrial and Engineering Chemistry Research; 2002; 41 (18), 4550-4558.

Dias D.P., Thaumaturgo C.; Fracture toughness of geopolymeric concretes reinforced with basalt fibers; Cement and Concrete Composites; 2005; 27 (1), 49-54.

Singh P.S., Trigg M., Burgar I., Bastow T.; Geopolymer formation processes at room temperature studied by 29Si and 27Al MAS-NMR; Materials Science and Engineering A; 2005; 396 (38719), 392-402.

Kriven W.M., Bell J., Gordon M.; Geopolymer refractories for the glass manufacturing industry; Ceramic Engineering and Science Proceedings; 2004; 25 (1), 57-79.

Bakharev T.; Geopolymeric materials prepared using Class F fly ash and elevated temperature curing; Cement and Concrete Research; 2005; 35 (6), 1224-1232.

Xu H., Van Deventer J.S.J.; Geopolymerisation of multiple minerals; Minerals Engineering; 2002; 15 (12), 1131-1139.

Kim D., Petrisor I.G., Yen T.F.; Geopolymerization of biopolymers: A preliminary inquiry; Carbohydrate Polymers; 2004; 56 (2), 213-217.

Davidovits J.; Geopolymers: Inorganic Polymeric New Materials; Journal of thermal analysis; 1991; 37 (8), 1633-1656.

Zhang Y.S., Sun W., Li J.Z.; Hydration process of interfacial transition in potassium polysialate (K-PSDS) geopolymer concrete; Magazine of Concrete Research; 2005; 57 (1), 33-38.

Yunsheng Z., Wei S., Zongjin L.; Impact behavior and microstructural characteristics of PVA fiber reinforced fly ash-geopolymer boards prepared by extrusion technique; Journal of Materials Science; 2006; 41 (10), 2787-2794.

Sun W., Zhang Y.-S., Lin W., Liu Z.-Y.; In situ monitoring of the hydration process of K-PS geopolymer cement with ESEM; Cement and Concrete Research; 2004; 34 (6), 935-940.

Granizo M.L., Blanco-Varela M.T., Palomo A.; Influence of the starting kaolin on alkali-activated materials based on metakaolin. Study of the reaction parameters by isothermal conduction calorimetry; Journal of Materials Science; 2000; 35 (24), 6309-6315.

Oudadesse H., Derrien A.C., Lefloch M.; Infrared and nuclear magnetic resonance structural studies vs. thermal treatment of geopolymers/biphasic calcium phosphates; Journal of Thermal Analysis and Calorimetry; 2005; 82 (2), 323-329.

Phair J.W., Van Deventer J.S.J., Smith J.D.; Interaction of sodium silicate with zirconia and its consequences for polysialation; Colloids and Surfaces A: Physicochemical and Engineering Aspects; 2001; 182 (38720), 143-159.

Nair B., Zhao Q., Rahimian T., Cooper R.F., Balaguru P.N.; Matrix and interphase design of geopolymer composites; Ceramic Transactions; 2006; 175 ( ), 253-263.

Puertas F., Amat T., Fernandez-Jimenez A., Vazquez T.; Mechanical and durable behaviour of alkaline cement mortars reinforced with polypropylene fibres; Cement and Concrete Research; 2003; 33 (12), 2031-2036.

Phair J.W., Van Deventer J.S.J., Smith J.D.; Mechanism of polysialation in the incorporation of zirconia into fly ash-based geopolymers; Industrial and Engineering Chemistry Research; 2000; 39 (8), 2925-2934.

Williams P.J., Biernacki J.J., Walker L.R., Meyer H.M., Rawn C.J., Bai J.; Microanalysis of alkali-activated fly ash-CH pastes; Cement and Concrete Research; 2002; 32 (6), 963-972.

Yip C.K., Van Deventer J.S.J.; Microanalysis of calcium silicate hydrate gel formed within a geopolymeric binder; Journal of Materials Science; 2003; 38 (18), 3851-3860.

Katz A.; Microscopic study of alkali-activated fly ash; Cement and Concrete Research; 1998; 28 (2), 197-208.

Jiminez A.M.F., Lachowski E.E., Palomo A., Macphee D.E.; Microstructural characterisation of alkali-activated PFA matrices for waste immobilisation; Cement and Concrete Composites; 2004; 26 (8), 1001-1006.

Kriven W.M., Bell J.L., Gordon M.; Microstructure and microchemistry of fully-reacted geopolymers and geopolymer matrix composites; Ceramic Transactions; 2004; 153 ( ), 227-250.

Fernandez-Jimenez A., Palomo A., Criado M.; Microstructure development of alkali-activated fly ash cement: A descriptive model; Cement and Concrete Research; 2005; 35 (6), 1204-1209.

Schmucker M., MacKenzie K.J.D.; Microstructure of sodium polysialate siloxo geopolymer; Ceramics International; 2005; 31 (3), 433-437.

Fernandez-Jimenez A., Palomo A.; Mid-infrared spectroscopic studies of alkali-activated fly ash structure; Microporous and Mesoporous Materials; 2005; 86 (38720), 207-214.

Puertas F., Fernandez-Jimenez A.; Mineralogical and microstructural characterisation of alkali-activated fly ash/slag pastes; Cement and Concrete Composites; 2003; 25 (3), 287-292.

Provis J.L., Duxson P., Lukey G.C., Van Deventer J.S.J.; Modeling Si/Al ordering in metakaolin-based geopolymers; Ceramic Transactions; 2006; 175 ( ), 245-252.

Provis J.L., Duxson P., Lukey G.C., Separovic F., Kriven W.M., Van Deventer J.S.J.; Modeling speciation in highly concentrated alkaline silicate solutions; Industrial and Engineering Chemistry Research; 2005; 44 (23), 8899-8908.

Duxson P., Lukey G.C., Van Deventer J.S.J.; Nanostructural design of multifunctional geopolymeric materials; Ceramic Transactions; 2006; 175 ( ), 203-214.

Zhang S., Gong K., Lu J.; Novel modification method for inorganic geopolymer by using water soluble organic polymers; Materials Letters; 2004; 58 (38906), 1292-1296.

Singh P.S., Bastow T., Trigg M.; Outstanding problems posed by nonpolymeric particulates in the synthesis of a well-structured geopolymeric material; Cement and Concrete Research; 2004; 34 (10), 1943-1947.

Puertas F., Fernandez-Jimenez A., Blanco-Varela M.T.; Pore solution in alkali-activated slag cement pastes. Relation to the composition and structure of calcium silicate hydrate; Cement and Concrete Research; 2004; 34 (1), 139-148.

Vallepu R., Nakamura Y., Komatsu R., Ikeda K., Mikuni A.; Preparation of forsterite by the geopolymer technique-gel compositions as a function of pH and crystalline phases; Journal of Sol-Gel Science and Technology; 2005; 35 (2), 107-114.

Palomo A., Banfill P.F.G., Fernandez-Jimenez A., Swift D.S.; Properties of alkali-activated fly ashes determined from rheological measurements; Advances in Cement Research; 2005; 17 (4), 143-151.

Fernandez-Jimenez A., De La Torre A.G., Palomo A., Lopez-Olmo G., Alonso M.M., Aranda M.A.G.; Quantitative determination of phases in the alkali activation of fly ash. Part I. Potential ash reactivity; Fuel; 2006; 85 (38843), 625-634.

Davidovits Joseph; Recent progresses in concretes for nuclear waste and uranium waste containment; Concrete International; 1994; 16 (12), 53-58.

Steveson M., Sagoe-Crentsil K.; Relationships between composition, structure and strength of inorganic polymers : PPPPart I Metakaolin-derived inorganic polymers; Journal of Materials Science; 2005; 40 (8), 2023-2036.

Bakharev T., Sanjayan J.G., Cheng Y.-B.; Resistance of alkali-activated slag concrete to acid attack; Cement and Concrete Research; 2003; 33 (10), 1607-1611.

Bakharev T., Sanjayan J.G., Cheng Y.-B.; Resistance of alkali-activated slag concrete to carbonation; Cement and Concrete Research; 2001; 31 (9), 1277-1283.

Bakharev T.; Resistance of geopolymer materials to acid attack; Cement and Concrete Research; 2005; 35 (4), 658-670.

Li Z., Zhang Y., Zhou X.; Short fiber reinforced geopolymer composites manufactured by extrusion; Journal of Materials in Civil Engineering; 2005; 17 (6), 624-631.

Brough A.R., Atkinson A.; Sodium silicate-based, alkali-activated slag mortars—Part I. Strength, hydration and microstructure; Cement and Concrete Research; 2002; 32 (6), 865-879.

Goretta K.C., Chen N., Gutierrez-Mora F., Routbort J.L., Lukey G.C., van Deventer J.S.J.; Solid-particle erosion of a geopolymer containing fly ash and blast-furnace slag; Wear; 2004; 256 (38906), 714-719.

Shi C., Fernandez-Jimenez A.; Stabilization/solidification of hazardous and radioactive wastes with alkali-activated cements; Journal of Hazardous Materials; 2006; 137 (3), 1656-1663.

Provis J.L., Duxson P., Lukey G.C., Van Deventer J.S.J.; Statistical thermodynamic model for Si/Al ordering in amorphous aluminosilicates; Chemistry of Materials; 2005; 17 (11), 2976-2986.

Lee W.K.W., Van Deventer J.S.J.; Structural reorganisation of class F fly ash in alkaline silicate solutions; Colloids and Surfaces A: Physicochemical and Engineering Aspects; 2002; 211 (1), 49-66.

Singh P.S., Bastow T., Trigg M.; Structural studies of geopolymers by 29Si and 27Al MAS-NMR; Journal of Materials Science; 2005; 40 (15), 3951-3961.

Xu J.Z., Zhou Y.L., Chang Q., Qu H.Q.; Study on the factors of affecting the immobilization of heavy metals in fly ash-based geopolymers; Materials Letters; 2006; 60 (6), 820-822.

Bakharev T., Sanjayan J.G., Cheng Y.-B.; Sulfate attack on alkali-activated slag concrete; Cement and Concrete Research; 2002; 32 (2), 211-216.

Allahverdi A., Skvara F.; Sulfuric acid attack on hardened paste of geopolymer cements part 1. Mechanism of corrosion at relatively high concentrations; Ceramics—Silikaty; 2005; 49(4), 225-229.

Lecomte I., Liegeois M., Rulmont A., Cloots R., Maseri F.; Synthesis and characterization of new inorganic polymeric composites based on kaolin or white clay and on ground-granulated blast furnace slag; Journal of Materials Research; 2003; 18 (11), 2571-2579.

Wang H., Li H., Yan F.; Synthesis and mechanical properties of metakaolinite-based geopolymer; Colloids and Surfaces A: Physicochemical and Engineering Aspects; 2005; 268 (38720), 1-6.

Wang H., Li H., Yan F.; Synthesis and tribological behavior of metakaolinite-based geopolymer composites; Materials Letters; 2005; 59 (29-30), 3976-3981.

Vallepu R., Mikuni A., Komatsu R., Ikeda K.; Synthesis of liebenbergite nano-crystallites from silicate precursor gels prepared by geopolymerization; Journal of Mineralogical and Petrological Sciences; 2005; 100 (4), 159-167.

Fernandez-Jimenez A., Puertas F.; The alkali-silica reaction in alkali-activated granulated slag mortars with reactive aggregate; Cement and Concrete Research; 2002; 32 (7), 1019-1024.

Van Jaarsveld J.G.S., Van Deventer J.S.J., Lukey G.C.; The characterisation of source materials in fly ash-based geopolymers; Materials Letters; 2003; 57 (7), 1272-1280.

Yip C.K., Lukey G.C., Van Deventer J.S.J.; The coexistence of geopolymeric gel and calcium silicate hydrate at the early stage of alkaline activation; Cement and Concrete Research; 2005; 35 (9), 1688-1697.

Fletcher R.A., MacKenzie K.J.D., Nicholson C.L., Shimada S.; The composition range of aluminosilicate geopolymers; Journal of the European Ceramic Society; 2005; 25 (9), 1471-1477.

Xu H., Van Deventer J.S.J.; The effect of alkali metals on the formation of geopolymeric gels from alkali-feldspars; Colloids and Surfaces A: Physicochemical and Engineering Aspects; 2003; 216 (38720), 27-44.

Van Jaarsveld J.G.S., Van Deventer J.S.J., Lukey G.C.; The effect of composition and temperature on the properties of fly ash- and kaolinite-based geopolymers; Chemical Engineering Journal; 2002; 89 (38720), 63-73.

Perera D.S., Vance E.R., Cassidy D.J., Blackford M.G., Hanna J.V., Trautman R.L., Nicholson C.L.; The effect of heat on geopolymers made using fly ash and metakaolinite; Ceramic Transactions; 2005; 165 ( ), 87-94.

Lee W.K.W., Van Deventer J.S.J.; The effect of ionic contaminants on the early-age properties of alkali-activated fly ash- based cements; Cement and Concrete Research; 2002; 32 (4), 577-584.

Xu H., Van Deventer J.S.J.; The geopolymerisation of alumino-silicate minerals; International Journal of Mineral Processing; 2000; 59 (3), 247-266.

Lee W.K.W., Van Deventer J.S.J.; The interface between natural siliceous aggregates and geopolymers; Cement and Concrete Research; 2004; 34 (2), 195-206.

Van Jaarsveld J.G.S., Van Deventer J.S.J., Lorenzen L.; The potential use of geopolymeric materials to immobilise toxic metals: Part I. Theory and applications; Minerals Engineering; 1997; 10 (7), 659-669.

Van Jaarsveld J.G.S., Van Deventer J.S.J., Schwartzman A.; The potential use of geopolymeric materials to immobilise toxic metals: Part II. Material and leaching characteristics; Minerals Engineering; 1999; 12 (1), 75-91.

Provis J.L., Duxson P., van Deventer J.S.J., Lukey G.C.; The role of mathematical modelling and gel chemistry in advancing geopolymer technology; Chemical Engineering Research and Design; 2005; 83 (0.291666666666667), 853-860.

Fernandez-Jimenez A., Palomo A., Sobrados I., Sanz J.; The role played by the reactive alumina content in the alkaline activation of fly ashes; Microporous and Mesoporous Materials; 2006; 91 (38720), 111-119.

Bakharev T.; Thermal behaviour of geopolymers prepared using class F fly ash and elevated temperature curing; Cement and Concrete Research; 2006; 36 (6), 1134-1147.

Barbosa V.F.F., MacKenzie K.J.D.; Thermal behaviour of inorganic geopolymers and composites derived from sodium polysialate; Materials Research Bulletin; 2003; 38 (2), 319-331.

Feng D., Tan H., Van Deventer J.S.J.; Ultrasound enhanced geopolymerisation; Journal of Materials Science; 2004; 39 (2), 571-580.

Duxson P., Provis J.L., Lukey G.C., Mallicoat S.W., Kriven W.M., Van Deventer J.S.J.; Understanding the relationship between geopolymer composition, microstructure and mechanical properties; Colloids and Surfaces A: Physicochemical and Engineering Aspects; 2005; 269 (38720), 47-58.

Lee W.K.W., Van Deventer J.S.J.; Use of infrared Spectroscopy to Study Geopolymerization of Heterogeneous Amorphous Aluminosilicates; Langmuir; 2003; 19 (21), 8726-8734.

Buchwald A.; What are geopolymers? Current state of research and technology, the opportunities they offer, and their significance for the precast industry [Was sind geopolymere? Stand von forschung und technik sowie chancen und bedeutung für die fertigteilindustrie]; Betonwerk und Fertigteil-Technik/Concrete Precasting Plant and Technology; 2006; 72 (7), 42-49.

J. Davidovits (Synthesis of New High-Temperature Geo-Polymers for Reinforced Plastic/composites, SPE PACTEC'79, Society of Plastic Engineers) in 1976 at the IUPAC International Symposium on Macromolecules held in Stockholm.

* cited by examiner

GEOPOLYMER COMPOSITION AND APPLICATION IN OILFIELD INDUSTRY

FIELD OF THE INVENTION

The present invention broadly relates to well cementing. More particularly the invention relates to the use of geopolymers, to geopolymer slurry compositions and the related methods of placing the geopolymer composition in a well using conventional or unconventional cementing techniques.

DESCRIPTION OF THE PRIOR ART

Geopolymers are a novel class of materials that are formed by chemical dissolution and subsequent recondensation of various aluminosilicate oxides and silicates to form an amorphous three-dimensional framework structure. Therefore, a geopolymer is a three-dimensional aluminosilicate mineral polymer. The term geopolymer was proposed and first used by J. Davidovits (Synthesis of new high-temperature geopolymers for reinforced plastics/composites, SPE PACTEC' 79, Society of Plastics Engineers) in 1976 at the IUPAC International Symposium on Macromolecules held in Stockholm.

Geopolymers based on alumino-silicates are designated as poly(sialate), which is an abbreviation for poly(silicon-oxo-aluminate) or $(-Si-O-Al-O-)_n$ (with n being the degree of polymerization). The sialate network consists of $SiO_4$ and $AlO_4$ tetrahedra linked alternately by sharing all the oxygens, with $Al^{3+}$ and $Si^{4+}$ in IV-fold coordination with oxygen. Positive ions ($Na^+, K^+, Li^+, Ca^{2+}$...) must be present in the framework cavities to balance the negative charge of $Al^{3+}$ in IV-fold coordination.

The empirical formula of polysialates is: $M_n\{-(SiO_2)_z-AlO_2\}_n$, $w\, H_2O$, wherein M is a cation such as potassium, sodium or calcium, n is a degree of polymerization and z is the atomic ratio Si/Al which may be 1, 2, 3 or more, until 35 as known today.

The three-dimensional network (3D) geopolymers are summarized in the table 1 below.

TABLE 1

Geopolymers chemical designation (wherein M is a cation such as potassium, sodium or calcium, and n is a degree of polymerization).

| Si/Al ratio | Designation | Structure | Abbreviations |
|---|---|---|---|
| 1 | Poly(sialate) | $M_n(-Si-O-Al-O-)_n$ | (M)-PS |
| 2 | Poly(sialate-siloxo) | $M_n(-Si-O-Al-O-Si-O)_n$ | (M)-PSS |
| 3 | Poly(sialate-disiloxo) | $M_n(-Si-O-Al-O-Si-O-Si-O-)_n$ | (M)-PSDS |

The properties and application fields of geopolymers will depend principally on their chemical structure, and more particularly on the atomic ratio of silicon versus aluminum. Geopolymers have been investigated for use in a number of applications, including as cementing systems within the construction industry, as refractory materials and as encapsulants for hazardous and radioactive waste streams. Geopolymers are also referenced as rapid setting and hardening materials. They exhibit superior hardness and chemical stability.

Various prior art disclose the use of geopolymer compositions in the construction industry. In particular U.S. Pat. No. 4,509,985 discloses a mineral polymer composition employed for the making of cast or molded products at room temperatures, or temperatures generally up to 120° C.; U.S. Pat. No. 4,859,367, U.S. Pat. No. 5,349,118 and U.S. Pat. No. 5,539,140 disclose a geopolymer for solidifying and storing waste material in order to provide the waste material with a high stability over a very long time, comparable to certain archeological materials, those waste materials can be dangerous or potentially toxic for human beings and the natural environment; or U.S. Pat. No. 5,356,579, U.S. Pat. No. 5,788,762, U.S. Pat. No. 5,626,665, U.S. Pat. No. 5,635,292 U.S. Pat. No. 5,637,412 and U.S. Pat. No. 5,788,762 disclose cementitious systems with enhanced compressive strengths or low density for construction applications. Patent application WO2005019130 is the first to highlight the problem of controlling the setting time of the geopolymer system in the construction industry. Effectively, as the geopolymers have a rapid set time, a retarder could be used to lengthen this set time.

However none of the prior art has discussed geopolymers for application in the oilfield industry. And if WO2005019130 has the merit to disclose a specific type of novel family of geopolymers with some retarding effects on the set time for the construction industry, no real control of the set time is proposed for all the other geopolymer systems. In addition further major technical challenges affect potential cementing systems to be used in the oilfield industry. These problems are, for example the control of the thickening and setting times for large temperature and density ranges for the geopolymer slurry, the mixability and also the pumpabilty of such slurry. Other properties have also to be considered, such as the compressive strength and permeability of the set geopolymer material. Therefore, it would be desirable to produce geopolymers solving those problems and having still good properties for oilfield applications.

SUMMARY OF THE INVENTION

In one embodiment the invention discloses a geopolymeric composition formed from a suspension comprising an aluminosilicate source, a metal silicate, an alkali activator and a carrier fluid wherein the suspension of said geopolymeric composition is a pumpable composition in the oilfield industry. All the four components do not need necessarily to be added separately: for example the alkali activator can be already within a carrier fluid. So, the aluminosilicate source can be in the form of a solid component; the metal silicate can be in the form of a solid or of a mix of metal silicate within a carrier fluid; the alkali activator can be in the form of a solid or of a mix of alkali activator within a carrier fluid. Importance is to have a carrier fluid to make suspension if aluminosilicate source, metal silicate and alkali activator are all in solid state. If the aluminosilicate source, and the metal silicate are in the solid state and the alkali activator is in the liquid state, the alkali activator is considered to already have a carrier fluid within. Further, as it is understood, use of a single carrier fluid is not required, two or more carrier fluids can be used. The geopolymeric composition has such rheological properties that the suspension of said geopolymeric composition has a good pumpability and stability. A pumpable composition in the oilfield industry has a rheology lesser than or equal to 300 cP, preferably in other embodiments lesser than or equal to 250 cP, more preferably in another embodiment lesser than or equal to 200 cP. Further, the suspension made is a stable suspension. The geopolymeric composition is mixable and pumpable; therefore applications in the oilfield industry are possible.

To control the setting time of the geopolymeric composition the alkali activator is chosen with a given pH, and/or a retarder is added and/or an accelerator is added to the suspension of said geopolymeric composition. The alkali activator can be generally an alkali metal hydroxide, more preferably a sodium or potassium hydroxide; it can be also a carbonate material. The retarder is selected from the group consisting of boron containing compound, lignosulfate, sodium gluconate, sodium glucoheptonate, tartaric acid and phosphorus containing compounds. Preferably, the retarder is an anhydrous or hydrated alkali metal borate or a pure oxide of boron. More preferably, the retarder is a sodium pentaborate decahydrate, boric acid, or borax. The accelerator is a lithium containing compound. Preferably the accelerator is a salt of lithium. More preferably, the accelerator is lithium chloride. The control of the setting time is here efficient from 20° C. to 120° C. Sodium pentaborate decahydrate and borax are able to control setting time from 20° C., preferably from 25° C.

To control the density of the geopolymeric composition, a lightweight particle and/or a heavyweight material can be added. The lightweight particles also called fillers are selected from the group consisting of cenospheres, sodium-calcium-borosilicate glass, and silica-alumina microspheres. The heavy particles also called the weighting agents are typically selected from the group consisting of manganese tetroxide, iron oxide (hematite), barium sulfate (barite), silica and iron/titanium oxide (ilmenite). The geopolymeric compositions can also be foamed by foaming the suspension of said geopolymeric composition with a gas as for example air, nitrogen or carbon dioxide. The geopolymeric composition can further comprise a gas generating additive which will introduce the gas phase in the suspension. Preferably, the density of the suspension of said geopolymeric slurry compositions varies between 1 gram per cubic centimeter and 2.5 grams per cubic centimeter, more preferably between 1.2 grams per cubic centimeter and 1.8 grams per cubic centimeter.

In a second embodiment, the suspension of said geopolymeric composition can further comprise a mixture of two or more aluminosilicate source. In a further other embodiment, the suspension of said the geopolymeric composition can comprise a second binder component which may be a conventional cementing material such as Portland cement, micro-cement or silica fume.

In a third embodiment, the suspension of said geopolymeric composition can comprise a gas phase so the gas phase or part of the gas phase remains in the geopolymeric composition. For example, the gas phase can be a water-immiscible dispersed nitrogen phase.

In a fourth embodiment, the suspension of said geopolymeric composition can comprise a water-immiscible phase. For example, this can be a water-immiscible dispersed oil-based phase.

In a fifth embodiment, the geopolymeric composition further comprises an additive selected from the group consisting of an activator, an antifoam, a defoamer, silica, a fluid loss control additive, a flow enhancing agent, a dispersant, a rheology modifier, a foaming agent, a surfactant and an anti-settling additive.

The geopolymeric compositions according to the invention are preferably poly(sialate), poly(sialate-siloxo) or poly(sialate-disiloxo). More preferably, the geopolymeric composition are poly(sialate-siloxo) components and therefore the silicon to aluminum atomic ratio is substantially equal to two, between 1.8 and 2.2.

In another aspect of the invention a geopolymeric composition is disclosed which is formed from a suspension comprising an aluminosilicate source, a metal silicate, an alkali activator, a retarder and/or an accelerator and a carrier fluid wherein the oxide molar ratio $M_2O/SiO_2$ is greater than 0.20 with M being the metal. Preferably, the oxide molar ratio $M_2O/SiO_2$ is greater than or equal to 0.27.

When the retarder is used, it is preferably a boron containing compound and the suspension of said geopolymeric composition has an oxide molar ratio $B_2O_3/H_2O$ of less than 0.03. More preferably, the geopolymeric slurry composition has an oxide molar ratio $B_2O_3/H_2O$ of less than or equal to 0.02.

When the accelerator is used, it is preferably a lithium containing compound and the suspension of said geopolymeric composition has an oxide molar ratio $Li_2O/H_2O$ of less than 0.2. More preferably, the geopolymeric slurry composition has an oxide molar ratio $Li_2O/H_2O$ of less than or equal to 0.1.

The geopolymeric composition according to the invention uses aluminosilicate source which is selected from the group consisting of ASTM type C fly ash, ASTM type F fly ash, ground blast furnace slag, calcined clays, partially calcined clays (such as metakaolin), aluminum-containing silica fume, natural aluminosilicate, synthetic aluminosilicate glass powder, zeolite, scoria, allophone, bentonite and pumice. Preferably, the geopolymeric composition is made with metakaolin, ground granulated blast furnace slag and/or fly ash.

The geopolymeric composition according to the invention uses a metal silicate, with the metal selected from the group consisting of lithium, sodium, potassium, rubidium and cesium. Preferably, the metal is sodium or potassium. In another embodiment, the metal silicates can be replaced by ammonium silicates. The metal silicate in another embodiment can be encapsulated.

The geopolymeric composition according to the invention uses for the alkali activator, for example an alkali metal hydroxide. Preferably, the alkali metal hydroxide is sodium or potassium hydroxide. The alkali activator and/or the metal silicate and/or the carrier fluid may be encapsulated. Alkali carbonates can also be used as alkali activator. Also, the alkali activator in another embodiment can be encapsulated.

The geopolymeric composition according to the invention uses for the carrier fluid preferably an aqueous solution such as fresh water.

In another aspect of the invention a method to control the setting time of a geopolymeric composition for oilfield applications is disclosed. The method comprises the step of providing a suspension of the geopolymeric composition within a carrier fluid by adding: (i) a retarder and/or an accelerator; (ii) an aluminosilicate source; (iii) an alkali activator, and (iv) a metal silicate. The previous steps can be realized in another order. The geopolymer compositions of the invention prepared according to the method have controllable setting times at temperatures ranging from 20° C. to at least 120° C. The geopolymeric composition used is the same as disclosed above. And, the alkali activator is selected from the group consisting of sodium hydroxide and potassium hydroxide; the retarder is selected from the group consisting of boron containing compound, lignosulfate, sodium gluconate, sodium glucoheptonate, tartaric acid and phosphorus containing compounds.

To control the thickening and/or the setting times of the geopolymeric composition the nature and/or the pH and/or the concentration of the alkali activator is changed. By increasing the concentration of the alkali activator, the setting time is shortened and by changing the nature and/or pH, different setting times are obtained. To control the thickening time of the geopolymeric composition the nature and/or the concentration of the retarder is changed. By increasing the concentration of the retarder, the setting time is lengthened and by changing the nature, different setting times are obtained. In the same way, to control the setting time of the geopolymeric composition the nature and/or the concentration of the accelerator is changed. By increasing the concentration, the setting time is shortened and by changing the nature, different setting times are obtained. As it can be seen, three solutions exist to control the setting time, use of a special alkali activator, use of a retarder, or use of an accelerator. The three solutions can be used separately or in combination. Sometimes, the use of a special alkali activator does not give sufficiently long setting time and the use of a retarder may be preferred. Similarly the use of a special alkali activator may not give sufficiently short setting time and the use of an accelerator would be preferred.

In another aspect of the invention a method to control the density of a geopolymeric composition for oilfield industry is disclosed. The method comprises the step of providing a suspension of the geopolymeric composition within a carrier fluid by adding: (i) lightweight particles and/or heavy particles; (ii) an aluminosilicate source; (iii) an alkali activator; and a metal silicate; (ii) an alkali activator and/or metal silicate; and (iii) an aluminosilicate source. The previous steps can be realized in another order. Still, in another aspect of the invention the method further comprises the step of adding a retarder and/or an accelerator to the suspension. Still, in another aspect of the invention the method further comprises the step of foaming the suspension of said geopolymeric composition.

In another aspect of the invention a method to control the density of a geopolymeric composition for oilfield industry is disclosed, the method comprises the step of: (i) providing a suspension of said geopolymeric composition within a carrier fluid by mixing an aluminosilicate source, a metal silicate and an alkali activator in a carrier fluid, (ii) foaming the suspension of said geopolymeric composition. Still, in another aspect of the invention the method further comprises the step of adding a retarder and/or an accelerator to the suspension.

The method to control the density of geopolymer compositions of the invention applies for density range varying between 1 gram per cubic centimeter and 2 grams per cubic centimeter, but could also be applied to density range varying between 0.8 gram per cubic centimeter and 2.5 grams per cubic centimeter.

In another aspect of the invention a method to place a geopolymeric composition in a borehole and isolate subterranean formations is disclosed, the method comprises the step of: (i) providing a suspension of said geopolymeric composition as described above (ii) pumping the suspension of said geopolymeric composition into the borehole, and (iii) allowing the suspension of said geopolymeric composition to set and thereby form the geopolymeric composition.

In another embodiment, the step of providing a suspension of said geopolymeric composition further comprises adding a retarder and/or an accelerator. Effectively, it can be useful to lengthen the set of the geopolymeric composition by adding a retarder as seen above and/or it can be useful to accelerate the set of the geopolymeric composition by adding an accelerator as seen above.

Still, in another embodiment, the method comprises the step of activating in situ the suspension of said geopolymeric composition. Effectively, the method also applies if activation has to be realized downhole in the well, the activation does not necessarily refer to the alkali activator. Effectively, in a first embodiment the activation refers to activation via the alkali activator, the alkali activator is encapsulated as described previously or is released with a downhole device. In a second embodiment, the activation refers to any type of activation when various additives that need activation are used, as for example activation can be physical (by heat, UV radiation or other radiations); the activation can be made also with chemical components encapsulated and released at a predefined time or event. The capsule can be self destructed as previously explained or can be destroyed with help of stress and/or sonic perturbation.

In the first embodiment, the geopolymeric composition is retarded with a sufficiently long setting time so that an activation has to be done to provoke the set of geopolymeric composition. The activation is made here by the release of an accelerator. This release is realized downhole, in situ, by adding the accelerator directly to the suspension of said geopolymeric composition and/or if the accelerator is encapsulated in the suspension of said geopolymeric composition by break of the capsules.

Still, in another embodiment, the method comprises the step of activating the suspension of said geopolymeric composition just before use. For example, an inactivated suspension of geopolymer composition is made so that said suspension is stable for a long time. Said composition is storable, transportable and accessorily perishable after a period varying between one day and some months, preferably some days and three months. The storable suspension is taken to rig site in liquid form and is activated before pumping or downhole in situ as explained previously.

Preferably, the step of pumping the suspension of said geopolymeric composition is made with conventional well cementing equipment, familiar to those skilled in the art. The method applies as a primary cementing technique for cementing wells where the geopolymeric composition is pumped down a pipe until the shoe where it then flows up the annular space between the casing/liner and the borehole. A reverse circulation cementing technique can also be used for placing the geopolymer suspension at the desired depth in the borehole.

Further, the pumping and placement of geopolymer suspension below surface encompasses several other conventional cementing techniques such as the grouting of platform piles, skirts or the like, the squeeze operation for repair or plugging of an undesired leak, perforation, formation or the like, and the setting of a geopolymer composition plug for any purpose of a cement plug.

BRIEF DESCRIPTION OF THE DRAWING

Further embodiments of the present invention can be understood with the appended drawings.

DETAILED DESCRIPTION

Figure 1:
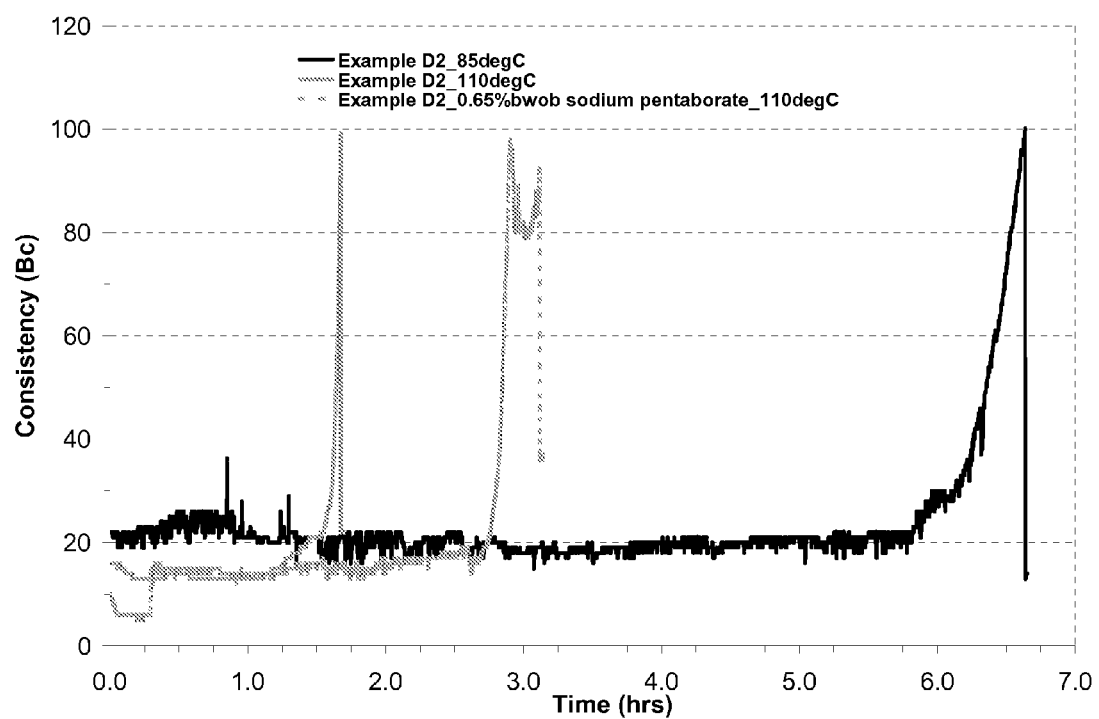
FIG. 1 shows the impact of temperature on the thickening time of geopolymer formulations.

According to the invention, the geopolymer formulations involve the use of an aluminosilicate source, a metal silicate and an alkali activator in a carrier fluid at near-ambient temperature. The carrier fluid is preferably a fresh water solution. As it has been said previously, all the four components do not need necessarily to be added separately: for example the alkali activator can be already within water. So, the aluminosilicate source can be in the form of a solid component; the metal silicate can be in the form of a solid or of an aqueous solution of metal silicate; the alkali activator can be in the form of a solid or of an aqueous solution of alkali activator.

Formation of the geopolymer concrete involves an aluminosilicate source, which is also called aluminosilicate binder. Examples of aluminosilicate source from which geopolymers may be formed include ASTM type C fly ash, ASTM type F fly ash, ground blast furnace slag, calcined clays, partially calcined clays (such as metakaolin), aluminum-containing silica fume, natural aluminosilicate, synthetic aluminosilicate glass powder, zeolite, scoria, allophone, bentonite and pumice. These materials contain a significant proportion of amorphous aluminosilicate phase, which reacts in strong alkali solutions. The preferred aluminosilicates are fly ash, metakaolin and blast furnace slag. Mixtures of two or more aluminosilicate sources may also be used if desired. In another embodiment, the aluminosilicate component comprises a first aluminosilicate binder and optionally one or more secondary binder components which may be chosen in the list: ground granulated blast furnace slag, Portland cement, kaolin, metakaolin or silica fume.

Formation of the geopolymer concrete involves also, an alkali activator. The alkali activator is generally an alkali metal hydroxide. Alkali metal hydroxides are generally preferred as sodium and potassium hydroxide. The metal hydroxide may be in the form of a solid or an aqueous mixture. Also, the alkali activator in another embodiment can be encapsulated. The alkali activator when in solid and/or liquid state can be trapped in a capsule that will break when subject for example, to stress on the capsule, to radiation on the capsule. Also, the alkali activator when in solid and/or liquid state can be trapped in a capsule that will naturally destroy due to the fact that for example, the capsule is made with biodegradable and/or self destructive material. Also, the alkali activator when in liquid state can be adsorbed onto a porous material and will be released after a certain time or due to a predefined event.

Formation of the geopolymer concrete involves also, a metal silicate. The metal silicate is generally an alkali metal silicate. Alkali metal silicates, particularly sodium silicate or potassium silicate, are preferred. Sodium silicates with a molar ratio of $SiO_2/Na_2O$ equal to or less than 3.2 are preferred. Potassium silicates with a molar ratio of $SiO_2/K_2O$ equal to or less than 3.2 are preferred. Also, the metal silicate in another embodiment can be encapsulated.

The method of the invention is applicable to the oilfield, preferably in completion of the well bore of oil or gas wells. To be used in oilfield application, a pumpable suspension is formed where the geopolymer blend is mixed with a carrier fluid. Various additives can be added to the suspension and the suspension is then pumped into the well bore. The suspension is then allowed to set up in the well to provide zonal isolation in the well bore.

Method of Placement of the Geopolymer

A typical property of geopolymer systems is their ability to set without delay after mixing. However for oilfield applications, mixable and pumpable geopolymer suspension is needed. For this reason, a way to retard the thickening of the geopolymer suspension or a way to control thickening times of the geopolymer is required.

A large family of retarders allowing delay in the set of the geopolymer has been found. In table 2, the results of thickening time tests performed as per ISO 10426-2 Recommended Practice in a High Pressure High Temperature (HPHT) consistometer are reported. Such tests are performed to simulate the placement from surface to downhole of cement suspensions, at a defined Bottom Hole Circulating Temperature (BHCT). To realize such tests, a temperature heatup schedule is followed in order to mimic placement in a real well. For the tests performed at 57° C., the temperature is reached in 41 minutes and the final pressure is 33.8 MPa (4900 psi). For the tests performed at 85° C., the temperature is reached in 58 minutes and the final pressure is 55.1 MPa (8000 psi). For the tests performed at 110° C., the temperature is reached in 74 minutes and the final pressure is 75.9 MPa (11000 psi).

TABLE 2

Examples of ISO10426-2 thickening time measured with HPHT consistometer (hours:min) obtained with different retarders at different temperature.

| | | % bwob (by weight of blend): | Temperature (° C.) | | | | |
|---|---|---|---|---|---|---|---|
| | | | 57 | 85 | | | 110 |
| | | | Sample | | | | |
| | | | A2 | A2 | B2 | C2 | D2 |
| | | | Thickening time: | | | | |
| Retarder | None | 0 | 6:25 | 0:53 | 0:37 | 5:45 | 1:40 |
| | $Na_2B_{10}O_{16}, 10H_2O$ | 0.65 | | | | 6:30 | 3:00 |
| | | 1.3 | 23:52 | 6:08 | | | |
| | | 1.6 | | 7:30 | | | |
| | | 1.8 | | 10:39 | 9:51 | | |
| | | 2 | | 13:05 | | | |
| | | 2.6 | | 28:23 | | | |

TABLE 2-continued

Examples of ISO10426-2 thickening time measured
with HPHT consistometer (hours:min) obtained with
different retarders at different temperature.

| | | Temperature (° C.) | | | | |
|---|---|---|---|---|---|---|
| | | 57 | 85 | | | 110 |
| | | | Sample | | | |
| | % bwob (by weight of blend): | A2 | A2 | B2 | C2 | D2 |
| | | | Thickening time: | | | |
| $H_3BO_3$ | 1.9 | | 20:53 | | | |
| Phosphonate/sodium pentaborate | 1.2 | | | 7:00 | | |
| Phosphonate/phosphate salt | 6.4 | >15:00 | | | | |
| Lignosulfonate | 1.51 | | 3:12 | | | |

Sample A2 is made by dissolving the retarder amount in 358 g of water, adding the blend comprising 314 g of metakaolin and 227 g of sodium disilicate in the solution under mixing, adding 17.2 g of sodium hydroxide under ISO 1026-2 mixing, pouring the suspension in HPHT cell. Sample A2 is then tested by measuring the thickening time with the HPHT consistometer.

Sample B2 is made by dissolving the retarder amount in 265 g of water, adding the blend comprising 232 g of metakaolin, 168 g of sodium disilicate and 414 g of silica particles as filler in the solution under mixing, adding 13 g of sodium hydroxide under ISO 10426-2 mixing, pouring the suspension in HPHT cell. Sample B2 is then tested by measuring the thickening time with the HPHT consistometer.

Sample C2 is made by dissolving the retarder amount in 422 g of sodium hydroxide solution, adding the blend comprising 440 g of type F fly ash and 88 g of sodium disilicate in the solution under mixing following ISO 10426-2 mixing, pouring the suspension in HPHT cell. Sample C2 is then tested by measuring the thickening time with the HPHT consistometer.

Sample D2 is made by dissolving the retarder amount in 374 mL of water, adding the blend comprising 411 g of type F fly ash and 82 g of sodium disilicate under mixing at 4000 rpm, adding 75 g of sodium hydroxide under ISO 10426-2 mixing, pouring the suspension in HPHT cell. Sample D2 is then tested by measuring the thickening time with the HPHT consistometer.

The retardation of geopolymeric formulations can be and is controlled at different BHCT by using either boron containing compounds as for example sodium pentaborate decahydrate, boric acid, borax, or lignosulphonate, or phosphorus containing compounds, or a mixture of them. Retardation of geopolymeric formulations will be sensitive to boron valence for boron containing compounds or phosphate valence for phosphorus containing compounds and/or to retarder concentration.

In table 3, the results obtained with Vicat apparatus with two boron-based retarders are presented. Vicat apparatus allows to measure when the setting of the material starts (IST) and ends (FST). It is based on the measurements of the penetration of a needle in a soft material. This apparatus is often used to realize pre-study at ambient temperature and atmospheric pressure.

TABLE 3

Examples of initial setting time (hours:min) obtained
with different retarders with Vicat apparatus at
ambient temperature and atmospheric pressure.

| | Sample | |
|---|---|---|
| | A3 | B3 |
| No additive | 1:45 | 12:00 |
| $Na_2B_{10}O_{16} \cdot 10H_2O$ | | |
| 2.6% bwob | 3:00 | — |
| 5.2% bwob | 4:10 | >500:00 |
| Borax | | |
| 4.2% bwob | 3:20 | — |

Sample A3 is made by dissolving the retarder amount in 139 g of sodium hydroxide solution, adding the blend comprising 105 g of metakaolin, 48 g of sodium metasilicate and 17 g of silica particles as filler in the solution under mixing. Sample A3 is then tested by pouring the suspension in a Vicat cell to measure setting time at 25° C.

Sample B3 is made by dissolving the retarder amount in 358 g of water, adding the blend comprising 314 g of metakaolin and 227 g of sodium disilicate in the solution under mixing, adding 17.2 g of sodium hydroxide under ISO 10426-2 mixing. Sample B3 is then tested by pouring the suspension in a Vicat cell to measure setting time at 25° C.

Retardation of geopolymeric formulations is sensitive to temperature. However, two boron-based retarders (sodium pentaborate decahydrate and borax) are able to strongly retard different types of geopolymer suspensions even at 25° C.

FIG. 1 illustrates the impact of temperature on the thickening time for a geopolymer composition made by adding a blend comprising 411 g of type F fly ash and 82 g of sodium disilicate in 374 mL of water under mixing (retarder being predissolved in this water) and by adding 36.5 g of sodium hydroxide under ISO 10426-2 mixing. This way, retarders are efficient even at high temperature to control geopolymer suspension thickening time.

Control of the thickening time can also be realized by other means. As an example the nature of the alkali activator and its pH have an impact on the thickening time. Table 4 illustrates the influence of the alkali activator on the thickening time of geopolymeric suspensions. It demonstrates the ability to select the alkali activator source according to the downhole conditions.

TABLE 4

Examples of ISO 10426-2 thickening time measured with HPHT consistometer (hours:min) with different alkali activators measured at 85° C.

| Sample | A4 | B4 |
|---|---|---|
| 100 Bc | 0:53 | >31:00 |

Sample A4 is made by adding the blend comprising 314 g of metakaolin and 227 g of sodium disilicate in 358 g of water under mixing, adding 17.2 g of sodium hydroxide under ISO10426-2 mixing, pouring the suspension in HPHT cell. Sample A4 is then tested by measuring the thickening time with a HPHT consistometer.

Sample B4 is made by adding the blend comprising 314 g of metakaolin and 227 g of sodium disilicate in 357 g of water under mixing, adding 23.4 g of sodium bicarbonate under ISO 10426-2 mixing, pouring the suspension in HPHT cell. Sample A4 is then tested by measuring the thickening time with a HPHT consistometer.

Control of the thickening and setting times by these methods of retardation can also be efficiently done with geopolymer having different silicon versus aluminum ratio.

Furthermore, depending on properties of the geopolymer, it can be suitable to accelerate thickening of the suspension. Table 5 illustrates the accelerating effect of lithium compounds on the thickening time of geopolymeric suspensions at temperature of 85° C. It demonstrates the ability of using lithium salts to control the thickening time of geopolymer suspensions.

TABLE 5

Examples of ISO 10426-2 thickening time measured with HPHT consistometer (hours:min) obtained with typ eF fly ashes and accelerators.

| | Sample | |
|---|---|---|
| | A5 | B5 |
| No additive | 22:57 | 5:21 |
| LiCl | | |
| 3.5% bwob | 9:07 | — |
| 7% bwob | 4:07 | |
| LiOH, H₂O | | |
| 2% bwob | — | 3:19 |

Sample A5 is made by adding the blend comprising 480 g of superfine type F fly ash and 96 g of sodium disilicate in 406 g of the sodium hydroxide solution containing an accelerator following ISO 10426-2 mixing, pouring the suspension in HPHT cell. Sample A5 is then tested by measuring the thickening time with a HPHT consistometer.

Sample B5 is made by adding the blend comprising 442 g of standard type F fly ash and 88 g of sodium disilicate in 423 g of the sodium hydroxide solution containing an accelerator following ISO 10426-2 mixing, pouring the suspension in HPHT cell. Sample B5 is then tested by measuring the thickening time with a HPHT consistometer.

Figure 2:
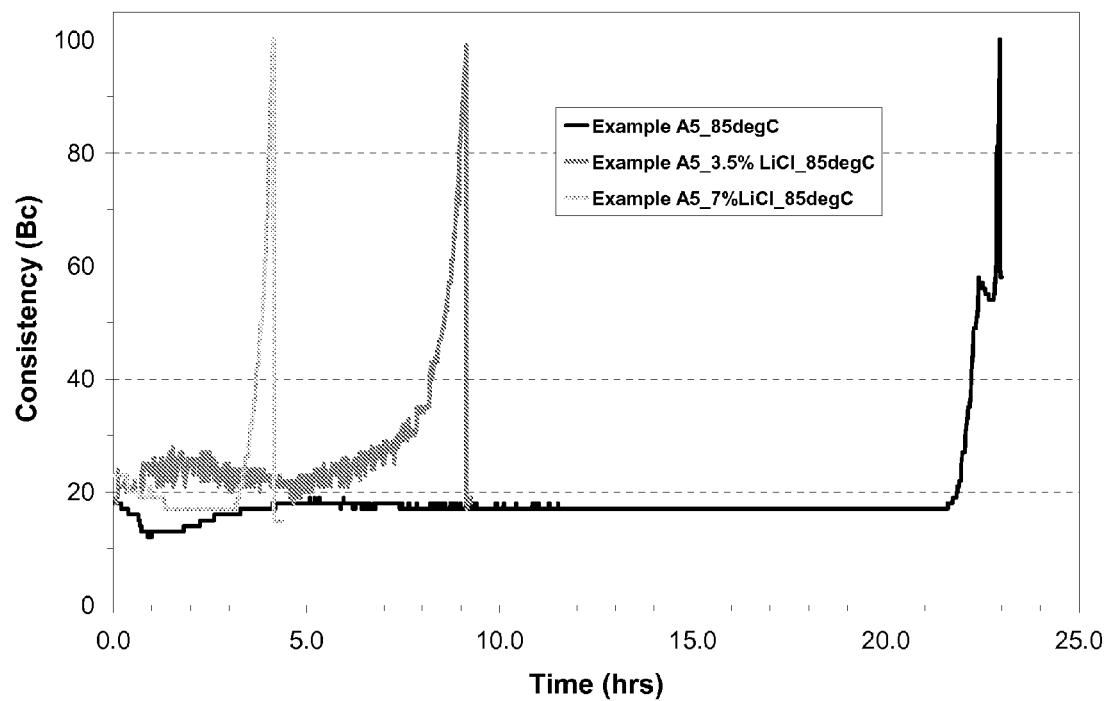
FIG. 2 shows the impact of accelerator addition on the thickening time of geopolymer formulations.

FIG. 2 illustrates the accelerating effect of lithium compounds on the thickening time for a geopolymer composition made by adding the blend comprising 480 g of superfine type F fly ash and 96 g of sodium disilicate in 406 g of the sodium hydroxide solution containing the accelerator following ISO 10426-2 mixing. The thickening time versus time of the suspension is then measured at temperature of 85° C. This way, accelerators such as lithium salts are shown to efficiently decrease the thickening time of geopolymer suspensions. The degree of acceleration of geopolymeric formulations is sensitive to accelerator type and/or concentration.

Depending on the properties of the geopolymer and on properties of the well, a real control of the thickening time of the suspension can be established. To increase the thickening time, nature of the retarder used can be changed, concentration of the retarder can be increased, nature of the alkali activator used can be changed, and nature of the aluminosilicate used can be changed.

Further, when use in oilfield application is sought, the geopolymer suspension has to be pumpable. Table 6 hereunder illustrates the rheological properties of geopolymer suspensions measured at a bottom hole circulating temperature (BHCT) of 60° C. Rheological values demonstrate the pumpability and the stability of geopolymeric suspensions for application in the oilfield industry.

TABLE 6

ISO 10426-2 Rheological and stability measurements obtained with different examples.

| | Sample | | |
|---|---|---|---|
| | A6 | B6 | C6 |
| PV/TY after mixing | 49/10 | 62/4 | 105/7 |
| ISO 10426-2 PV/TY at BHCT | 48/7 | 53/2 | 85/7 |
| ISO 10426-2 free fluid (mL) | 0 | 0 | 0 |

Sample A6 is made by adding the blend comprising 411 g of type F fly ash and 82 g of sodium disilicate in 374 mL of water under mixing, adding 75 g of sodium hydroxide under mixing. Sample A6 is then tested by measuring the rheological properties of the suspension after mixing and after conditioning at 60° C. according to the ISO 1026-2 standard procedure.

Sample B6 is made by dissolving the 0.65% bwob of sodiumpentaborate decahydrate in 422 g of sodium hydroxide solution, adding the blend comprising 440 g of type F fly ash and 88 g of sodium disilicate in the solution under ISO 10426-2 mixing, adding 36.5 g of sodium hydroxide under mixing. Sample B6 is then tested by measuring the rheological properties of the geopolymer suspension after mixing and after conditioning at 60° C. according to the ISO 10426-2 standard procedure.

Sample C6 is made by adding the blend comprising 480 g of type F fly ash and 96 g of sodium disilicate in 406 g of the sodium hydroxide solution following ISO 10426-2 mixing conditions. Sample C6 is then tested by measuring the rheological properties of the suspension after mixing and after conditioning at 60° C. according to the ISO 1-0426-2 standard procedure.

Table 7 shows the difference of setting time according to the conditions of setting. The geopolymer formulation will set more rapidly in static than in dynamic conditions. Also normally, the geopolymer suspension should set rapidly after placement.

TABLE 7

Example comparing dynamic and static setting times (hours:min) at 85° C.

| | Sample | |
|---|---|---|
| | A7 | B7 |
| Additive | None | 2% bwob LiOH, H$_2$O |
| TT Test Pressure of 8000 psi/dynamic | 5:45 | 3:19 |
| Vicat test (samples oven cured) Atmospheric pressure/static | 2:30 | 1:50 |

Sample A7 is made by adding the blend comprising 440 g of type F fly ash and 88 g of sodium disilicate in 422 g of the water under mixing following ISO 10426-2 mixing, pouring the suspension in HPHT cell or the Vicat cell.

Sample B7 is made by adding the blend comprising 442 g of standard type F fly ash and 88 g of sodium disilicate in 424 g of the sodium hydroxide solution containing 2% bwob LiOH, H$_2$O following ISO 10426-2 mixing, pouring the suspension in HPHT consistometer or in the Vicat cell.

Also, when use in oilfield application is sought, the geopolymer suspension has to have a large range of densities. As presented in table 8, the tested geopolymer formulations propose a density range between 1.45 g/cm$^3$ [12.1 lbm/gal] up to 1.84 g/cm$^3$ [15.4 lbm/gal] either in reducing the water content, or in adding fillers.

TABLE 8

Examples of suspension density obtained with some geopolymeric formulations.

| | Sample | |
|---|---|---|
| | A8 | B8 |
| Suspension density g/cm$^3$ (lbm/gal) | 1.84 (15.4) | 1.44 (12.06) |

Sample A8 is made by dissolving the retarder amount in 265 g of water, adding the blend comprising 232 g of metakaolin, 168 g of sodium disilicate and 414 g of silica particles as filler in the solution under mixing, adding 13 g of sodium hydroxide under ISO 10426-2 mixing.

Sample B8 is made by dissolving the retarder amount in 139 g of sodium hydroxide solution, adding the blend comprising 105 g of metakaolin, 48 g of sodium metasilicate and 17 g of silica particles as filler in the solution under mixing.

Further, to broaden the density range, either lightweight particles are added to reach lower densities or heavy particles to reach higher densities. The lightweight particles typically have density of less than 2 g/cm$^3$, and generally less than 1.3 g/cm$^3$. By way of example, it is possible to use hollow microspheres, in particular of silico-aluminate, known as cenospheres, a residue that is obtained from burning coal and having a mean diameter of about 150 micrometers. It is also possible to use synthetic materials such as hollow glass bubbles, and more particularly preferred are bubbles of sodium-calcium-borosilicate glass presenting high compression strength or indeed microspheres of a ceramic, e.g. of the silica-alumina type. The lightweight particles can also be particles of a plastics material such as beads of polypropylene. The heavy particles typically have density of more than 2 g/cm$^3$, and generally more than 3 g/cm$^3$. By way of example, it is possible to use hematite, barite, ilmenite, silica and also manganese tetroxide commercially available under the trade names of MicroMax and MicroMax FF.

Further, to broaden the density range, it is possible to foam the geopolymer composition. The gas utilized to foam the composition can be air or nitrogen, nitrogen being the most preferred. The amount of gas present in the cement composition is that amount which is sufficient to form a foam having a density in the range of from about 1 g.cm$^{-3}$ to 1.7 g.cm$^{-3}$ (9 to 14 lbm/gal).

In a further embodiment, other additives can be used with the geopolymer according to the present invention. Additives known to those of ordinary skill in the art may be included in the geopolymer compositions of the present embodiments. Additives are typically blended with a base mix or may be added to the geopolymer suspension. An additive may comprise an activator, an antifoam, a defoamer, silica, a fluid loss control additive, a flow enhancing agent, a dispersant, an anti-settling additive or a combination thereof, for example. Selection of the type and amount of additive largely depends on the nature and composition of the set composition, and those of ordinary skill in the art will understand how to select a suitable type and amount of additive for compositions herein.

In another embodiment, when various components are used with or within the geopolymer formulation, the particle size of the components is selected and the respective proportion of particles fractions is optimized in order to have at the same time the highest Packing Volume Fraction (PVF) of the solid, and obtaining a mixable and pumpable slurry with the minimum amount of water, i.e., at slurry Solid Volume Fraction (SVF) of 35-75% and preferably of 50-60%. More details can be found in European patent EP 0 621 247. The following examples do not constitute a limit of the invention but rather indicate to those skilled in the art possible combinations of the particle size of the various components of the geopolymer compositions of the invention to make a stable and pumpable suspension.

The geopolymeric composition can be a "trimodal" combination of particles: "large" for example sand or crushed wastes (average dimension 100-1000 micrometers), "medium" for example materials of the type of glass beads or fillers (average dimension 10-100 micrometers), "fines" like for example a micromaterial, or micro fly ashes or other micro slags (average dimension 0.2-10 micrometers). The geopolymeric composition can also be a "tetramodal" combination of particles type: with "large" (average dimension about 200-350 micrometers), "medium" glass beads, or fillers (average dimension about 10-20 micrometers), "fine" (average dimension about 1 micrometer), "very fine" (average dimension about 0.1-0.15 micrometer). The geopolymeric composition can also be a further combinations between the further categories: "very large", for example glass maker sand, crushed wastes (average dimension superior to 1 millimeter) and/or "large", for example sand or crushed wastes (average dimension about 100-1000 micrometers) and/or "medium" like glass beads, or fillers, or crushed wastes (average dimension 10-100 micrometers) and "fine" like, for example, micro fly ashes or other micro slags (average dimension 0.2-10 micrometer) and/or "very fine" like, for example, a latex or pigments or polymer microgels like a usual fluid loss control agent (average dimension 0.05-0.5 micrometer) and/or "ultra fine" like some colloidal silica or alumina (average dimension 7-50 nanometers).

Mechanical Strength

The compressive mechanical properties of set geopolymer compositions was studied using systems after curing them for several days under high pressure and temperature in high pressure and high temperature chambers to simulate the conditions encountered in an oil or gas well.

Tables 9 and 10 illustrate that geopolymer formulations proposed by this invention exhibit acceptable compressive strengths with low Young's Modulus for oilfield applications with or without retarder.

TABLE 9

Mechanical properties measured after 7 days at 90° C. - 20.7 MPa (3000 psi)

| | Sample | | | |
|---|---|---|---|---|
| | A9 | A9 | B9 | B9 |
| Sodium pentaborate % bwob | 0 | 1.8 | 0 | 1.8 |
| Unconfined Compressive Strength (UCS) MPa | 19 | 14 | 15 | 13 |
| Young's modulus MPa | 2400 | 2100 | 2300 | 3000 |

Sample A9 is made by dissolving the retarder amount (if necessary) in 358 g of water, adding the blend comprising 314 g of metakaolin and 227 g of sodium disilicate in the solution under mixing, adding 17.2 g of sodium hydroxide under ISO 10426-2 mixing, pouring the suspension into moulds and placing the moulds in a curing chamber for 7 days at 90° C.-20.7 MPa [3000 psi] according to ISO 10426-2 procedure. Sample A9 is then tested by measuring the compressive strength and Young's modulus.

Sample B9 is made by dissolving the retarder amount (if necessary) in 265 g of water, adding the blend comprising 232 g of metakaolin, 168 g of sodium disilicate and 414 g of silica particles as filler in the solution under mixing, adding 13 g of sodium hydroxide under ISO 10426-2 mixing, pouring the suspension into moulds and placing the moulds in a curing chamber for 7 days at 90° C.-20.7 MPa [3000 psi] according to ISO 10426-2 procedure. Sample B9 is then tested by measuring the compressive strength and Young's modulus.

TABLE 10

Mechanical properties measured after 21 days at 90° C. - 20.7 MPa (3000 psi)

| | Sample | | |
|---|---|---|---|
| | A10 | B10 | C10 |
| Lithium chloride % bwob | 0 | 3 | 7 |
| Unconfined Compressive Strength (UCS) MPa | 9.5 | 9.5 | 9 |
| Young's modulus MPa | 1750 | 2550 | 2950 |

Sample A10 is made by adding the blend comprising 482 g of standard type F fly ash and 96 g of sodium disilicate in 408 g of the sodium hydroxide solution containing the accelerator following ISO 10426-2 mixing, pouring the suspension into moulds and placing the moulds in a curing chamber for 21 days at 90° C.-20.7 MPa [3000 psi], according to ISO 10426-2 procedure. Sample A10 is then tested by measuring the compressive strength and Young's modulus.

Sample B10 is made by adding the blend comprising 442 g of standard type F fly ash and 88 g of sodium disilicate in 424 g of the sodium hydroxide solution containing 3% bwob LiCl following ISO 10426-2 mixing, pouring the suspension into moulds and placing the moulds in a curing chamber for 21 days at 90° C.-20.7 MPa [3000 psi], according to ISO 10426-2 procedure. Sample B10 is then tested by measuring the compressive strength and Young's modulus.

Sample C10 is made by adding the blend comprising 480 g of superfine type F fly ash and 96 g of sodium disilicate in 406 g of the sodium hydroxide solution containing 7% bwob LiCl following ISO 10426-2 mixing, pouring the suspension into moulds and placing the moulds in a curing chamber for 21 days at 90° C.-20.7 MPa [3000 psi], according to ISO 10426-2 procedure. Sample C10 is then tested by measuring the compressive strength and Young's modulus.

Because, the compositions of the present invention exhibit good compressive strengths with low Young modulus, they would be very useful in oilfield applications.

Permeability Properties

The water permeabilities were measured for some prepared geopolymer compositions. The isolation properties of a set geopolymer was studied using systems which had passed several days under high pressure and temperature in high pressure and high temperature chambers to simulate the conditions encountered in an oil well.

Table 11 illustrates that geopolymer formulations proposed by this invention exhibit acceptable permeability for oilfield applications.

TABLE 11

Water permability measured after curing at 90° C. - 20.7 MPa (3000 psi)

| | Sample | | | |
|---|---|---|---|---|
| | A11 | B11 | C11 | D11 |
| Water permeability [mD] | 0.08 | <0.008 | <0.006 | <0.006 |

Sample A11 is made by dissolving the retarder amount in 265 g of water, adding the blend comprising 232 g of metakaolin, 168 g of sodium disilicate and 414 g of silica particles as filler in the solution under mixing, adding 13 g of sodium hydroxide under API mixing, pouring the suspension in molds in a curing chamber for 7 days at 90° C.-3000 psi according to API procedure. Water permeability of sample A11 is then measured on cylindrical core (1-inch diameter by 2-inches length).

Sample B11 is made by adding the blend comprising 482 g of standard fly ash type F and 96 g of sodium disilicate in 408 g of the sodium hydroxide solution containing the accelerator following API mixing, pouring the suspension in molds in a curing chamber for 21 days at 90° C.-3000 psi, according to API procedure. Water permeability of sample B11 is then measured on cylindrical core (1-inch diameter by 2-inches length).

Sample C11 is made by adding the blend comprising 442 g of standard fly ash type F and 88 g of sodium disilicate in 424 g of the sodium hydroxide solution containing 3% bwob LiCl following API mixing, pouring the suspension in molds in a curing chamber for 21 days at 90° C.-3000 psi, according to API procedure. Water permeability of sample C11 is then measured on cylindrical core (1-inch diameter by 2-inches length).

Sample D11 is made by adding the blend comprising 480 g of superfine fly ash type F and 96 g of sodium disilicate in 406 g of the sodium hydroxide solution containing 7% bwob LiCl following API mixing, pouring the suspension in molds in a curing chamber for 21 days at 90° C.-3000 psi, according to API procedure. Water permeability of sample D11 is then measured on cylindrical core (1-inch diameter by 2-inches length).

Because, the compositions of the present invention exhibit acceptable water permeability, oilfield applications are possible.

Applications of the Geopolymer

The methods of the present invention are useful in completing well, such as for example oil and/or gas well, water well, geothermal well, acid gas well, carbon dioxide injection or production well and ordinary well. Placement of the geopolymer composition in the portion of the wellbore to be completed is accomplished by means that are well known in the art of wellbore cementing. The geopolymer composition is typically placed in a wellbore surrounding a casing to prevent vertical communication through the annulus between the casing and the wellbore or the casing and a larger casing. The geopolymer suspension is typically placed in a wellbore by circulation of the suspension down the inside of the casing, followed by a wiper plug and a nonsetting displacement fluid. The wiper plug is usually displaced to a collar, located near the bottom of the casing. The collar catches the wiper plug to prevent overdisplacement of the geopolymer composition and also minimizes the amount of the geopolymer composition left in the casing. The geopolymer suspension is circulated up the annulus surrounding the casing, where it is allowed to harden. The annulus could be between the casing and a larger casing or could be between the casing and the borehole. As in regular well cementing operations, such cementing operations with a geopolymer suspension may cover only a portion of the open hole, or more typically up to a point inside the next larger casing or sometimes up to the surface. This method has been described for completion between formation and a casing, but can be used in any type of completion, for example with a liner, a slotted liner, a perforated tubular, an expandable tubular, a permeable tube and/or tube or tubing.

In the same way, the methods of the present invention are useful in completing well, such as for example oil and/or gas well, water well, geothermal well, acid gas well, carbon dioxide well and ordinary well, wherein placement of the geopolymer composition in the portion of the wellbore to be completed is accomplished by means that are well known in the art of wellbore reverse circulation cementing.

The geopolymer composition can also be used in squeeze job and/or in remedial job. The geopolymer material is forced through perforations or openings in the casing, whether these perforations or openings are made intentionally or not, to the formation and wellbore surrounding the casing to be repaired. Geopolymer material is placed in this manner to repair and seal poorly isolated wells, for example, when either the original cement or geopolymer material fails, or was not initially placed acceptably, or when a producing interval has to be shut off.

The geopolymer composition can also be used in abandonment and/or plugging job. The geopolymer material is used as a plug to shut off partially or totally a zone of the well. Geopolymer material plug is placed inside the well by means that are well known in the art of wellbore plug cementing.

The geopolymer composition can also be used in grouting job to complete a part of the annulus as described in Well Cementing from Erik B. Nelson. The geopolymer material is used to complete down this annulus. Geopolymer material is placed inside the well by means that are well known in the art of wellbore cementing.

The geopolymer composition can also be used for fast-setting operation, in-situ operation. Effectively, the geopolymer composition can have a setting time perfectly controlled, allowing an instant setting when desired. For example, a retarder/accelerator combination can be added to the geopolymer composition to cause the system to be retarded for an extended period of time and then to set upon addition of an accelerator.

According to other embodiments of the invention, the methods of completion described above can be used in combination with conventional cement completion.

EXAMPLES

Geopolymer Compositions

The following examples will illustrate the practice of the present invention in its preferred embodiments.

Example 1

Geopolymer composition is made in the amounts by weight of the total dry components as follows: 58.1% metakaolin and 41.9% sodium disilicate. Dry components are mixed with the appropriate amount of water, sodium hydroxide and additives. The specific gravity of the suspension is 1.53 g/cm$^3$ [12.80 lbm/gal]. The geopolymer has the following oxide molar ratios:

$SiO_2/Al_2O_3$=4.00
$Na_2O/SiO_2$=0.27
$Na_2O/Al_2O_3$=1.07
$H_2O/Na_2O$=17.15

Example 2

Geopolymer composition is made in the amounts by weight of the total dry components as follows: 28.5% metakaolin, 20.6% sodium disilicate and 50.9% of a blend of silica particles. Dry components are mixed with the appropriate amount of water, sodium hydroxide and additives. The specific gravity of the suspension is 1.84 g/cm$^3$ [15.40 lbm/gal]. The geopolymer matrix has the following oxide molar ratios:

$SiO_2/Al_2O_3$=4.00
$Na_2O/SiO_2$=0.27
$Na_2O/Al_2O_3$=1.07
$H_2O/Na_2O$=17.15

Example 3

Geopolymer composition is made in the amounts by weight of the total dry components as follows: 35.2% metakaolin and 64.2% potassium disilicate. Dry components are mixed with the appropriate amount of water, potassium hydroxide and additives. The specific gravity of the suspension is 1.78 g/cm$^3$ [14.91 lbm/gal]. The geopolymer matrix has the following oxide molar ratios:

$SiO_2/Al_2O_3$=4.00
$K_2O/SiO_2$=0.27
$K_2O/Al_2O_3$=1.07
$H_2O/K_2O$=17.46

Example 4

Geopolymer composition is made in the amounts by weight of the total dry components as follows: 83.3% standard fly ash type F and 16.7% sodium disilicate. Dry components are mixed with the appropriate amount of water, sodium hydroxide and additives. The specific gravity of the suspension is 1.66 g/cm³ [13.83 lbm/gal]. The geopolymer has the following oxide molar ratios:

$SiO_2/Al_2O_3$=4.00
$Na_2O/SiO_2$=0.27
$Na_2O/Al_2O_3$=1.08
$H_2O/Na_2O$=13.01

The invention claimed is:

1. A pumpable geopolymeric composition for use in oilfield industry formed from a suspension comprising an aluminosilicate source, a metal silicate, an alkali activator and a carrier fluid wherein the suspension has a viscosity lesser than or equal to 300 cP.

2. The geopolymeric composition of claim 1, further comprising a retarder to control the thickening and/or the setting times of the suspension of said geopolymeric composition.

3. The geopolymeric composition of claim 1, wherein the retarder is selected from the group constituted of boron containing compound, lignosulfate, sodium gluconate, sodium glucoheptonate, tartaric acid and phosphorus containing compound, or a mixture of them.

4. The geopolymeric composition of claim 1, wherein the retarder is efficient from 20° C. to 120° C.

5. The geopolymeric composition of claim 1, further comprising an accelerator to control the thickening and/or the setting times of the suspension of said geopolymeric composition.

6. The geopolymeric composition of claim 5, wherein the accelerator is a lithium containing compound.

7. The geopolymeric composition of claim 5, wherein the accelerator is efficient from 20° C. to 120° C.

8. The geopolymeric composition of claim 1, further comprising a lightweight particle selected from the group constituted of: cenospheres, sodium-calcium-borosilicate glass, and silica-alumina microspheres.

9. The geopolymeric composition of claim 1, further comprising a heavy particle selected from the group constituted of manganese tetroxide, iron oxide, barium sulfate, silica and iron/titanium oxide.

10. The geopolymeric composition of claim 1, further comprising a gas phase.

11. The geopolymeric composition of claim 10, wherein the gas phase is introduced by foaming the suspension of said geopolymeric composition with air, nitrogen.

12. The geopolymeric composition of claim 10, further comprising a gas generating additive and wherein the gas phase is introduced by the use of said gas generating additive.

13. The geopolymeric composition of claim 1, further comprising a water-immiscible phase.

14. The geopolymeric composition of claim 13, wherein the water-immiscible phase is an oil-based phase.

15. The geopolymeric composition of claim 1, wherein the density of the suspension of said geopolymeric composition varies between 1 gram per cubic centimeter and 2.5 grams per cubic centimeter.

16. The geopolymeric composition of claim 1, further comprising an additive selected from the group constituted of: an activator, an antifoam, a defoamer, silica, a fluid loss control additive, a flow enhancing agent, a dispersant, a rheology modifier, a foaming agent, a surfactant and an antisettling additive.

17. A pumpable geopolymeric composition formed from a suspension comprising an aluminosilicate source, a metal silicate, an alkali activator, a retarder and/or an accelerator and a carrier fluid wherein the oxide molar ratio $M_2O/SiO_2$ is greater than 0.20 with M being an alkali metal and wherein said pumpable geopolymeric composition has a viscosity lesser than or equal to 300 cP.

18. The geopolymeric composition of claim 17, wherein the oxide molar ratio $M_2O/SiO_2$ is greater than or equal to 0.27.

19. The geopolymeric composition of claim 17, wherein the retarder is a boron containing compound and wherein the suspension of said geopolymeric composition has an oxide molar ratio $B_2O_3/H_2O$ of less than 0.03.

20. The geopolymeric composition of claim 19, wherein the oxide molar ratio $B_2O_3/H_2O$ is less than or equal to 0.02.

21. The geopolymeric composition of claim 17, wherein the accelerator is a lithium containing compound and wherein the suspension of said geopolymeric composition has an oxide molar ratio $Li_2O/H_2O$ of less than 0.2.

22. The geopolymeric composition of claim 21, wherein the oxide molar ratio $Li_2O/H_2O$ is less than or equal to 0.1.

23. The geopolymeric composition of claim 17, wherein the silicon to aluminum atomic ratio is between 1.8 and 2.2.

24. The geopolymeric composition of claim 23, wherein the silicon to aluminum atomic ratio is substantially equal to two.

25. The geopolymeric composition of claim 17, wherein the aluminosilicate source is selected from the group constituted of type C fly ash, type F fly ash, ground blast furnace slag, calcined clays, partially calcined clays, aluminium-containing silica fume, natural aluminosilicate, synthetic aluminosilicate glass powder, zeolite, scoria, allophone, bentonite and pumice.

26. The geopolymeric composition of claim 17, wherein the metal is selected from the group constituted of lithium, sodium, potassium, rubidium, and cesium.

27. The geopolymeric composition of claim 17, wherein the alkali activator is an alkali metal hydroxide.

28. The geopolymeric composition of claim 17, wherein the alkali activator and/or the carrier fluid is encapsulated.

29. The geopolymeric composition of claim 17, wherein the metal silicate and/or the carrier fluid is encapsulated.

30. A pumpable geopolymeric composition formed from a suspension within water comprising an aluminosilicate source, a metal silicate, an alkali activator, and a retarder and/or an accelerator wherein the oxide molar ratio $M_2O/SiO_2$ is greater than 0.20 with M being an alkali metal and wherein said pumpable geopolymeric composition has a viscosity lesser than or equal to 300 cP.

31. The geopolymeric composition of claim 30, wherein the oxide molar ratio $M_2O/SiO_2$ is greater than or equal to 0.27.

32. The geopolymeric composition of claim 30, wherein the retarder is a boron containing compound and wherein the suspension of said geopolymeric composition has an oxide molar ratio $B_2O_3/H_2O$ of less than 0.03.

33. The geopolymeric composition of claim 32, wherein the oxide molar ratio $B_2O_3/H_2O$ is less than or equal to 0.02.

34. The geopolymeric composition of claim 30, wherein the accelerator is a lithium containing compound and wherein the suspension of said geopolymeric composition has an oxide molar ratio $Li_2O/H_2O$ of less than 0.2.

35. The geopolymeric composition of claim 34, wherein the oxide molar ratio $Li_2O/H_2O$ is less than or equal to 0.1.

36. The geopolymeric composition of claim 30, wherein the silicon to aluminum atomic ratio is between 1.8 and 2.2.

37. The geopolymeric composition of claim 36, wherein the silicon to aluminum atomic ratio is substantially equal to two.

38. The geopolymeric composition of claim 30, wherein the aluminosilicate source is selected from the group constituted of type C fly ash, type F fly ash, ground blast furnace slag, calcined clays, partially calcined clays, aluminium-containing silica fume, natural aluminosilicate, synthetic aluminosilicate glass powder, zeolite, scoria, allophone, bentonite and pumice.

39. The geopolymeric composition of claim 30, wherein the metal is selected from the group constituted of lithium, sodium, potassium, rubidium, and cesium.

40. The geopolymeric composition of claim 30, wherein the alkali activator is an alkali metal hydroxide.

41. The geopolymeric composition of claim 30, wherein the alkali activator and/or the alkali activator within water is encapsulated.

42. The geopolymeric composition of claim 30, wherein the metal silicate and/or the metal silicate within water is encapsulated.

43. A pumpable geopolymeric composition formed from a suspension within water comprising an aluminosilicate source, a metal silicate, an alkali activator, and a retarder and/or an accelerator wherein the geopolymer composition is in majority a poly(sialate-siloxo) geopolymer and wherein the oxide molar ratio $M_2O/SiO_2$ is greater than 0.20 with M being an alkali metal and wherein said pumpable geopolymeric composition has a viscosity lesser than or equal to 300 cP.

44. The geopolymeric composition of claim 43, wherein the oxide molar ratio $M_2O/SiO_2$ is greater than or equal to 0.27.

45. The geopolymeric composition of claim 43, wherein the retarder is a boron containing compound.

46. The geopolymeric composition of claim 43, wherein the accelerator is a lithium containing compound.

47. The geopolymeric composition of claim 43, wherein the silicon to aluminum atomic ratio is between 1.8 and 2.2.

48. The geopolymeric composition of claim 47, wherein the silicon to aluminum atomic ratio is substantially equal to two.

49. The geopolymeric composition of claim 43, wherein the aluminosilicate source is selected from the group constituted of type C fly ash, type F fly ash, ground blast furnace slag, calcined clays, partially calcined clays, aluminium-containing silica fume, natural aluminosilicate, synthetic aluminosilicate glass powder, zeolite, scoria, allophone, bentonite and pumice.

50. The geopolymeric composition of claim 43, wherein the metal is selected from the group constituted of lithium, sodium, potassium, rubidium, and cesium.

51. The geopolymeric composition of claim 43, wherein the alkali activator is an alkali metal hydroxide.

52. The geopolymeric composition of claim 43, wherein the alkali activator and/or the alkali activator within water is encapsulated.

53. The geopolymeric composition of claim 43, wherein the metal silicate and/or the metal silicate within water is encapsulated.

54. A method to control the setting time and/or the thickening time of a pumpable geopolymeric composition having a viscosity less than or equal to 300 cP, comprising the step of providing a suspension of said geopolymeric composition within a carrier fluid by adding:
   (i) a retarder and/or an accelerator;
   (ii) an aluminosilicate source;
   (iii) an alkali activator; and
   (iv) a metal silicate.

55. The method of claim 54, wherein the method applies for temperature ranges from 20° C. to 120° C.

56. The method of claim 54, wherein the alkali activator is selected from the group constituted of: sodium hydroxide and potassium hydroxide, whether encapsulated or not.

57. The method of claim 54, wherein the retarder is selected from the group constituted of boron containing compound, lignosulfate, sodium gluconate, sodium glucoheptonate, tartaric acid and phosphorus containing compounds, or a mixture of them.

58. The method of claim 54, wherein the accelerator is a lithium containing compound.

59. The method of claim 54, wherein the retarder and/or the accelerator is encapsulated.

60. The method of claim 54, wherein the thickening and/or the setting times are controlled by changing the nature and/or the concentration of the retarder and/or accelerator.

61. The method of claim 54, wherein the thickening and/or the setting times are controlled by changing the pH and/or the concentration of the alkali activator.

62. A method to control the setting time and/or the thickening time of a pumpable geopolymeric composition having a viscosity less than or equal to 300 cP, comprising the step of providing a suspension of said geopolymeric composition within a carrier fluid by adding:
   (i) an aluminosilicate source;
   (ii) an alkali activator; and
   (iii) a metal silicate.

63. The method of claim 62, wherein the thickening and/or the setting times are controlled by changing the pH and/or the concentration of the alkali activator.

64. The method of claim 62, wherein the alkali activator and/or the alkali activator within a carrier fluid is encapsulated.

65. A method to control the density of a pumpable geopolymeric composition having a viscosity less than or equal to 300 cP, comprising the step of providing a suspension of said geopolymeric composition within a carrier fluid by adding:
   (i) lightweight particles and/or heavy particles;
   (ii) an aluminosilicate source;
   (iii) an alkali activator; and
   (iv) a metal silicate.

66. The method of claim 65, further comprising the step of adding a retarder and/or an accelerator.

67. The method of claim 65, further comprising the step of foaming the suspension of said geopolymeric composition.

68. The method of claim 65, wherein the density range varies between 1 gram per cubic centimeter and 2.5 grams per cubic centimeter.

69. A method to control the density of a pumpable geopolymeric composition having a viscosity less than or equal to 300 cP, comprising the step of:
   (i) providing a suspension of said geopolymeric composition within a carrier fluid by mixing an aluminosilicate source, a metal silicate, and an alkali activator, and
   (ii) foaming the suspension of said geopolymeric composition.

70. The method of claim 69, wherein the density range varies between 1 gram per cubic centimeter and 2.5 grams per cubic centimeter.

71. A method to place a pumpable geopolymeric composition, having a viscosity less than or equal to 300 cP, in a borehole in a formation comprising the step of:
   (i) providing a suspension of said geopolymeric composition within a carrier fluid by mixing an aluminosilicate source, a metal silicate and an alkali activator to said suspension, (ii) pumping the suspension of said geopolymeric composition into the borehole, and (iii) allowing the suspension of said geopolymeric composition to set and thereby form the geopolymeric composition.

72. The method of claim 71, wherein the step of providing a suspension of said geopolymeric composition further comprises adding a retarder.

73. The method of claim 71, wherein the step of providing a suspension of said geopolymeric composition further comprises adding an accelerator.

74. The method of claim 71, wherein the step of providing a suspension of said geopolymeric composition further comprises adding a retarder and an accelerator.

75. The method of claim 71, further comprising the step of activating in situ the suspension of said geopolymeric composition.

76. The method of claim 71, wherein the step of pumping the suspension of said geopolymeric composition is made with conventional tools of wellbore cementing.

77. The method of claim 71, wherein the method applies to the placement of the geopolymeric composition in an annular space between a casing and the borehole.

78. The method of claim 71, wherein the method applies to the placement of the geopolymeric composition through a hole made in a casing.

79. The method of claim 71, wherein the method applies to the placement of the geopolymeric composition to plug a zone of the borehole.

80. A method to place a pumpable geopolymeric composition, having a viscosity less than or equal to 300 cP, in a borehole in a formation comprising the step of:

(i) providing a suspension of said geopolymeric composition within a carrier fluid by mixing an aluminosilicate source, a retarder, a metal silicate and an alkali activator to said suspension, (ii) pumping the suspension of said geopolymeric composition into the borehole, (iii) activating in situ the suspension of said geopolymeric composition by releasing an accelerator within the suspension of said geopolymeric composition, and (iv) allowing the suspension of said geopolymeric composition to set and thereby form the geopolymeric composition.

81. The method of claim 80, wherein the accelerator and/or the accelerator within the carrier fluid is encapsulated before activating and is de-capsulated for activating.

82. The method of claim 80, wherein the step of pumping the suspension of said geopolymeric composition is made with conventional tools of wellbore cementing.

83. The method of claim 80, wherein the method applies to the placement of the geopolymeric composition in an annular space between a casing and the borehole.

84. The method of claim 80, wherein the method applies to the placement of the geopolymeric composition through a hole made in a casing.

85. The method of claim 80, wherein the method applies to the placement of the geopolymeric composition to plug a zone of the borehole.

86. A method to place a pumpable geopolymeric composition, having a viscosity less than or equal to 300 cP, in a borehole in a formation comprising the step of:

(i) providing a stable suspension of said geopolymeric composition within a carrier fluid by mixing an aluminosilicate source, a retarder, a metal silicate and an alkali activator to said suspension, (ii) storing during a given time said stable suspension of said geopolymeric composition, (iii) activating the suspension of said geopolymeric composition by releasing an accelerator within the suspension of said geopolymeric composition, (iv) pumping the suspension of said geopolymeric composition into the borehole, and (v) allowing the suspension of said geopolymeric composition to set and thereby form the geopolymeric composition.

87. The method of claim 86, wherein the accelerator and/or the accelerator within the carrier fluid is encapsulated before activating and is de-capsulated for activating.

88. The method of claim 86, wherein the step of pumping the suspension of said geopolymeric composition is made with conventional tools of wellbore cementing.

89. The method of claim 86, wherein the method applies to the placement of the geopolymeric composition in an annular space between a casing and the borehole.

90. The method of claim 86, wherein the method applies to the placement of the geopolymeric composition through a hole made in a casing.

91. The method of claim 86, wherein the method applies to the placement of the geopolymeric composition to plug a zone of the borehole.

92. A method to place a pumpable geopolymeric composition, having a viscosity less than or equal to 300 cP, in a borehole in a formation comprising the step of:

(i) providing a stable suspension of said geopolymeric composition within a carrier fluid by mixing an aluminosilicate source, a retarder, a metal silicate and an alkali activator to said suspension, (ii) storing during a given time said stable suspension of said geopolymeric composition, (iii) pumping the suspension of said geopolymeric composition into the borehole, (iv) activating in situ the suspension of said geopolymeric composition by releasing an accelerator within the suspension of said geopolymeric composition, (v) allowing the suspension of said geopolymeric composition to set and thereby form the geopolymeric composition.

93. The method of claim 92, wherein the accelerator and/or the accelerator within the carrier fluid is encapsulated before activating and is de-capsulated for activating.

94. The method of claim 92, wherein the step of pumping the suspension of said geopolymeric composition is made with conventional tools of wellbore cementing.

95. The method of claim 92, wherein the method applies to the placement of the geopolymeric composition in an annular space between a casing and the borehole.

96. The method of claim 92, wherein the method applies to the placement of the geopolymeric composition through a hole made in a casing.

97. The method of claim 92, wherein the method applies to the placement of the geopolymeric composition to plug a zone of the borehole.

* * * * *